United States Patent
Leccia (10) Patent No.: US 6,545,859 B2
(45) Date of Patent: Apr. 8, 2003

(54) AUTOMATICALLY OPERATING INTERLOCK ASSEMBLY FOR ELECTRICAL CABINETS

(75) Inventor: Brad R. Leccia, Bethel Park, PA (US)

(73) Assignee: Eaton Corporation, Cleveland, OH (US)

( * ) Notice: Subject to any disclaimer, the term of this patent is extended or adjusted under 35 U.S.C. 154(b) by 257 days.

(21) Appl. No.: 09/772,612

(22) Filed: Jan. 30, 2001

(65) Prior Publication Data

US 2002/0100667 A1 Aug. 1, 2002

(51) Int. Cl.[7] .............................................. H02B 11/00
(52) U.S. Cl. ................ 361/607; 200/50.12; 200/50.13; 200/50.21; 200/50.24; 200/50.22; 361/615
(58) Field of Search ............................ 200/50.1, 50.02, 200/50.12, 50.13, 50.15, 50.17, 50.21, 50.23, 50.24, 50.25; 335/202; 218/155; 361/605–609, 615–616

(56) References Cited

U.S. PATENT DOCUMENTS

| | | | | |
|---|---|---|---|---|
| 4,724,288 A | * | 2/1988 | Kugler | ................ 200/50.01 |
| 4,982,310 A | * | 1/1991 | Phouybanhdyt | ............. 361/605 |
| 5,424,500 A | * | 6/1995 | Smith | ...................... 200/50.17 |
| 5,757,260 A | | 5/1998 | Smith et al. | |
| 5,905,244 A | | 5/1999 | Smith et al. | |
| 6,066,814 A | | 5/2000 | Smith et al. | |

* cited by examiner

Primary Examiner—Gregory Thompson
(74) Attorney, Agent, or Firm—Martin J. Moran (57) ABSTRACT

An automatically operating interlock device prevents access to the interior of an electrical cabinet when the device within the cabinet is electrically connected with a power supply. The interlock device is particularly suited for arc resistant circuit breaker cabinets. The circuit breakers within such cabinets typically move from a rearward position within the cabinet, wherein a pair of stabs on the back of the circuit breaker are electrically connected to a corresponding pair of quick disconnects, and a forward position within the stabs are disconnected from the quick disconnects. A levering in assembly including a levering in block controlled by a threaded rod is typically used to move the circuit breaker from one position to the other. The interlock device includes a cam pivotally secured near the forwardmost position of the levering in block, and a locking bar pivotally secured to the cam. The cam is biased so that the locking bar engages the cabinet door. When the levering in block is moved to its forwardmost position, it engages the cam, rotating the cam to withdraw the locking bar from the door.

17 Claims, 9 Drawing Sheets

AUTOMATICALLY OPERATING INTERLOCK ASSEMBLY FOR ELECTRICAL CABINETS

BACKGROUND OF THE INVENTION

1. Field of the Invention

This invention relates to automatic lockout mechanisms for electrical equipment containers.

2. Description of the Related Art

Electrical equipment such as circuit breakers is typically housed within containers designed to prohibit access to the equipment at times when servicing the equipment would be unsafe. A circuit breaker for medium voltage applications will typically include male and female connectors for disconnecting the circuit breaker from the circuit prior to opening the circuit breaker's container. Additionally, it is generally considered desirable to house such circuit breakers within an arc resistant container. To qualify as arc resistant, the door of the container must remain closed while the circuit breaker is in operation.

One example of a system for preventing access to a fuse box while the fuses are connected to the circuit is described in U.S. Pat. No. 5,757,260, issued to J. E. Smith et al. on May 26, 1998. This patent describes a pivoting rod blocking rotation of the door's handle when the box containing the fuses is not fully retracted from the circuit. When the box if fully retracted, a pin on the carriage roller engages a camming surface on the rod, disengaging the rod from the door handle mechanism and permitting the door to be opened. Additionally, a slider prevents access to the threaded rod of the levering in mechanism when the door's handle is rotated away from the locked position, thereby securing the carriage in the retracted position. An interlock acting on the door itself may be more reliable than an interlock acting on the door handle.

U.S. Pat. No. 5,905,244, issued to J. E. Smith et al. on May 18, 1999, describes an arc-resistant metal-clad switchgear. When the doors of the cabinet are closed, a plurality of tabs on the doors are positioned behind corresponding tabs on the edges of the cabinet's doorframe, thereby helping the door resist an explosion inside the cabinet.

U.S. Pat. No. 6,066,814, issued to J. E. Smith et al. on May 23, 2000, describes an interlock for a cabinet containing electrical equipment. The interlock includes a key actuated slider for securing a source breaker in a test position. The key necessary for accessing the levering in mechanism for the other breakers is secured within the lock of the source breaker unless the source breaker is locked in this test position, thereby cutting off current to the other breakers.

Therefore, there is a need for an improved interlock for electrical cabinets wherein the interlock mechanism secures the door itself, instead of the door's operating handle. Additionally, there is a need for an improved interlock having fewer components, greater reliability, and easier manufacture than previous interlocks.

SUMMARY OF THE INVENTION

The present invention is an automatically operating interlock for electrical cabinets, such as arc resistant circuit breaker cabinets. The interlock prevents opening the cabinet door unless the circuit breaker is completely disconnected from the circuit.

A typical circuit breaker for medium voltage applications is mounted on a carriage that is movable between a forward, disengaged position and a rearward, engaged position within the cabinet containing the circuit breaker. At least one pair of quick disconnects terminating in finger clusters protrudes from the rear of the circuit breaker, being dimensioned and configured to engage a pair of stabs at the rear of the circuit breaker's cabinet when the circuit breaker is in the rearward position, thereby connecting the circuit breaker to the protected circuit. A typical medium voltage circuit breaker will use three pairs of mating stab/quick disconnect combinations. When the circuit breaker is moved to its forward position, the finger clusters are withdrawn from the quick disconnects, thereby disconnecting the circuit breaker from the circuit.

Moving the circuit breaker from one position to the other is accomplished by means of a threaded rod extending from the front to the rear of the cabinet. A levering in block engages the threaded rod so that rotation of the threaded rod pushes the levering in block either forward or rearward. The levering in block is secured to the carriage, so that rotation of the threaded rod thereby moves the carriage forward or backward. This process is known as levering in.

The interlock includes a locking bar pivotally secured to a cam at one end and selectively engaging the cabinet's door at the other end. The cam is pivotally secured adjacent to the levering in apparatus, and is spring biased to hold the locking bar against a locking tab within the door. When the levering in block reaches its forwardmost position, it contacts the cam, rotating the cam so that the locking bar is retracted from the door. The door may thereby be opened. Moving the levering in block rearward permits the cam to rotate the locking bar back into engagement with the cabinet door.

It is therefore an aspect of the present invention to provide an automatically operating interlock for preventing access to electrical cabinets when the electrical equipment therein is connected to a power supply.

It is a further aspect of the present invention to provide an automatic interlock for electrical cabinets having a locking bar dimensioned and configured to secure a door in its closed position, and a cam dimensioned and configured to retract the locking bar from the door on the electrical equipment within the cabinet is disconnected.

It is an additional aspect of the present invention to provide an automatic interlock for electrical cabinets, preventing access to the interior of the cabinet whenever the levering in assembly therein is in any position except its forwardmost position.

It is a further aspect of the present invention to provide an automatically operating interlock directly engaging the door of the cabinet, thereby preventing the door of the cabinet from being raised prior to being rotated to its open position.

It is an additional object of the present invention to provide an automatic interlock for electrical cabinets that is simpler, more reliable, and easier to manufacture than previously available interlocks.

These and other aspects of the invention will become apparent through the following description and drawings.

BRIEF DESCRIPTION OF THE DRAWINGS

Like reference numbers denote like elements throughout the drawings.

DETAILED DESCRIPTION OF THE PREFERRED EMBODIMENTS

The invention is an automatically operating interlock for electrical cabinets. Such an interlock is particularly useful for arc resistant cabinets containing circuit breakers.

Figure 1:
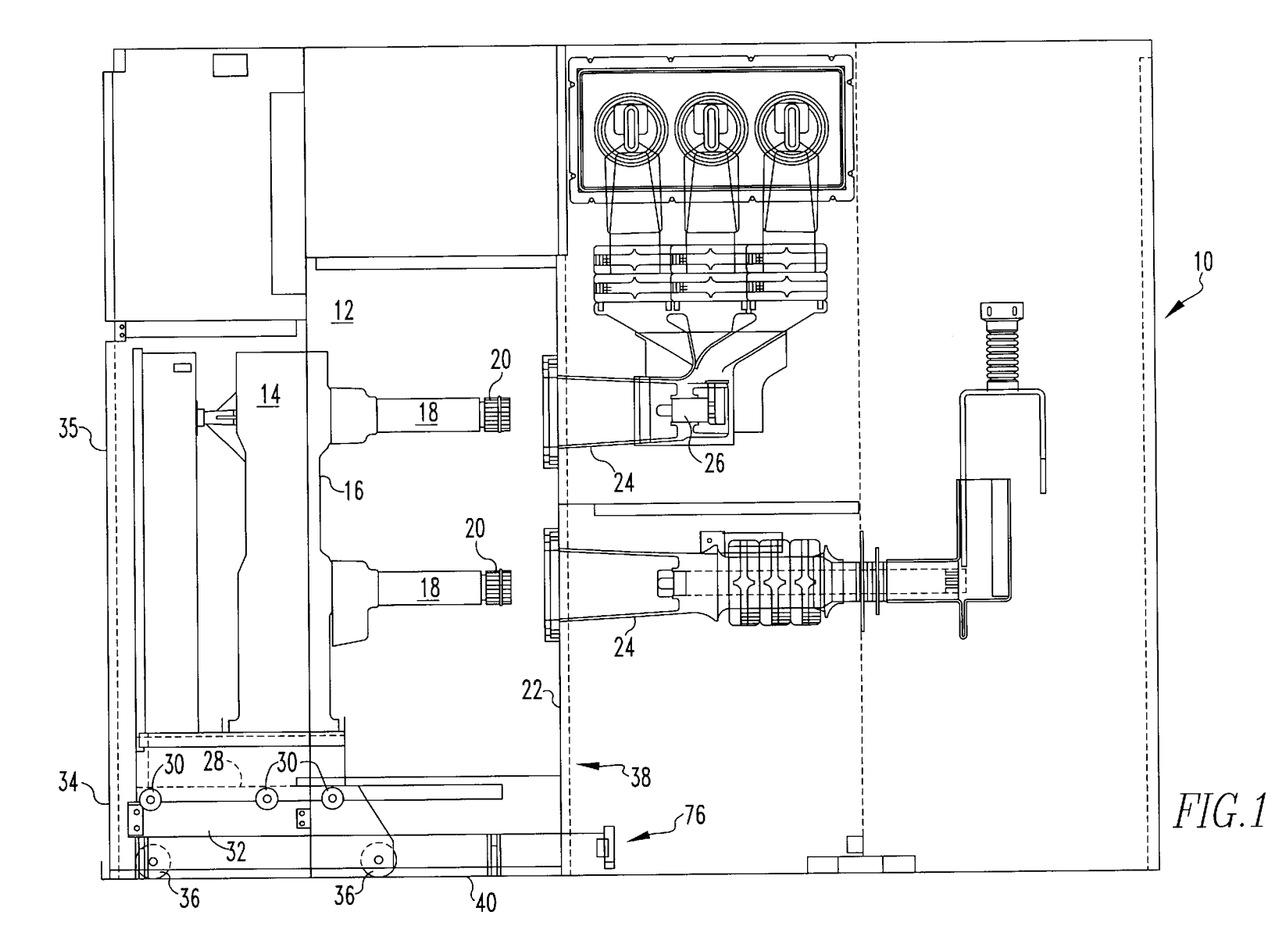
FIG. 1 is a side cross sectional view of a circuit breaker cabinet showing the circuit breaker in its forward, disengaged position.
Figure 2:
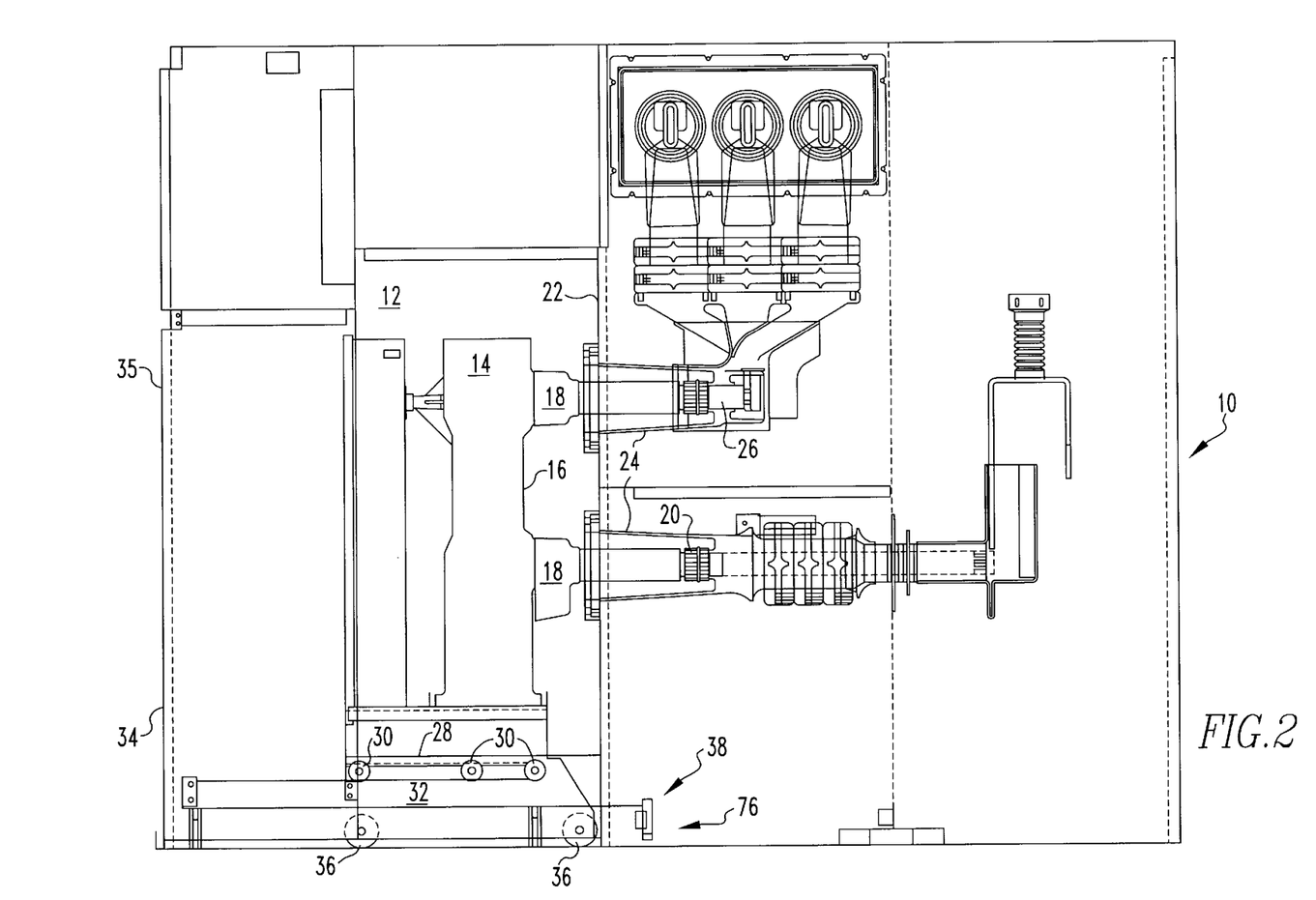
FIG. 2 is a side cross sectional view of a circuit breaker cabinet showing the circuit breaker in its rearward, engaged position.

An interlock of the present invention is best understood through and explanation of a conventional medium voltage circuit breaker. Referring to FIGS. 1 and 2, a switchgear assembly 10 is illustrated. The switchgear 10 includes cabinet 12, containing a circuit breaker 14. The back 16 of the circuit breaker 14 includes means for electrical connection with a circuit, which are preferably at least one pair of quick disconnects 18, with each quick disconnect 18 terminating with a plurality of contact fingers 20. The cabinet's rear wall 22 includes means for connecting to the means for electrical connection of the circuit breaker to a circuit, which preferably include a pair of channels 24, with each quick disconnect containing a primary contact or stab 26. Quick disconnects 18 and contact fingers 20 are dimensioned and configured so that, when the quick disconnects 18 are inserted into the channels 24, the contact fingers 20 are electrically connected to the primary contact 26. A typical medium voltage circuit breaker will include a combination of three pairs of quick disconnects 18 and three corresponding pairs of channels 24. The bottom 28 of circuit breaker 14 may include a plurality of rollers 30, dimensioned and configured to permit the circuit breaker to move along the rails 32, extending from the cabinet's rear 22 to the cabinet's front 34. The circuit breaker 14 may also rest on rollers 36, permitting the circuit breaker 14 to move within the cabinet 12.

Figure 3:
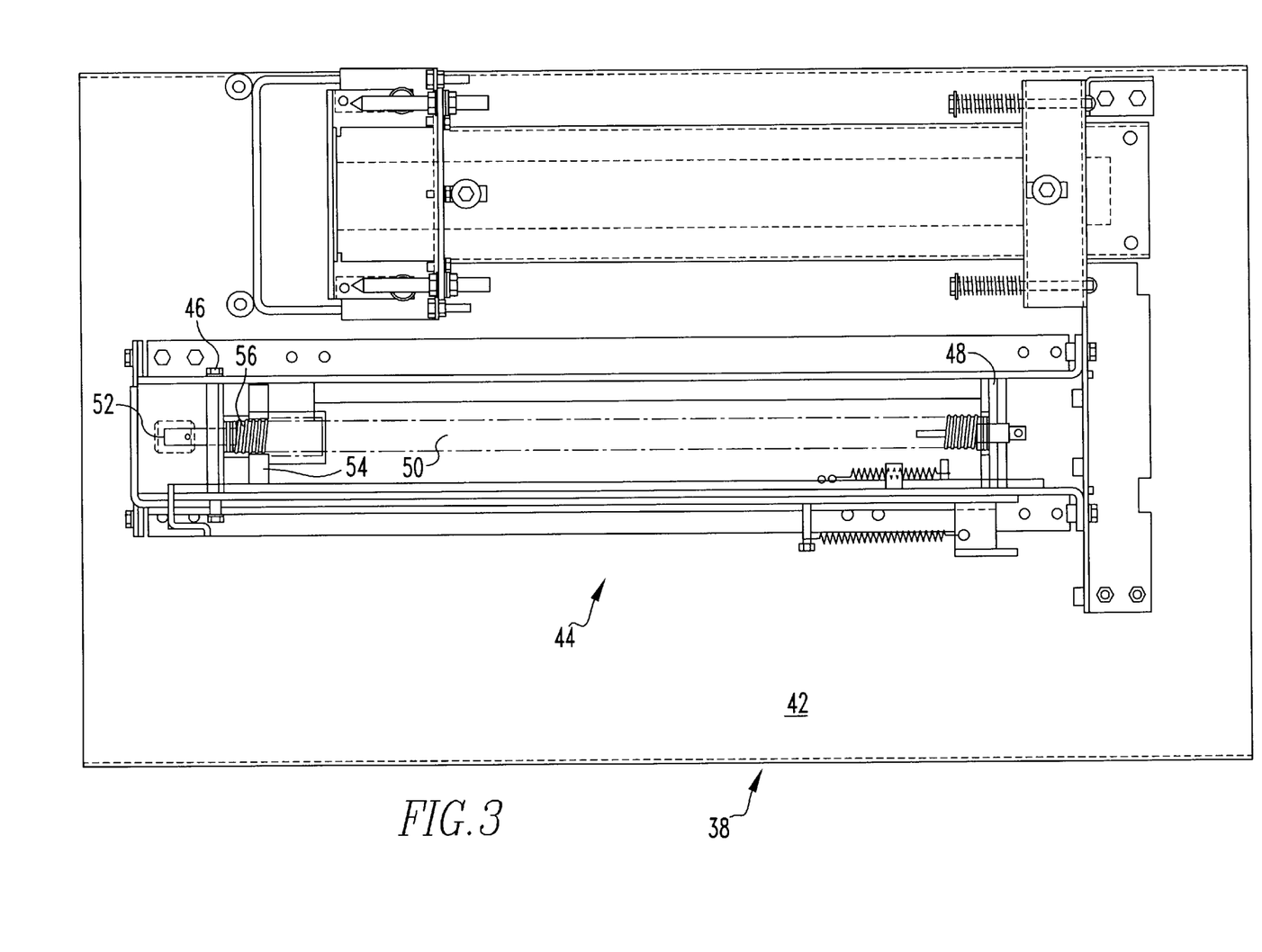
FIG. 3 is a top view of a levering in mechanism for a circuit breaker.

Referring to FIG. 3, the cabinet 12 also includes means for moving the circuit breaker 14 between a rearward position and a forward position, preferably including a levering in pan assembly 38 is secured to the bottom 40 of the cabinet 12. The levering in pan assembly 38 includes a pan 42, upon which the levering in assembly 44 is mounted. The levering in assembly 44 includes a front bearing block 46, mounted to the front of pan 42, and a rear-bearing block 48, mounted to the rear of pan 42. A drive screw 50 extends between the front bearing block 46 and rear-bearing block 48, terminating in a tip 52, dimensioned and configured to engage a crank. The tip 52 will typically be a hex drive. A levering in block 54 is thread mounted on the drive screw 50, so that rotation of the drive screw 50 moves the levering in block 54 forward or rearward. The levering in block may also include forward stop 56.

In use, the circuit breaker 14 will typically be in the rearward, engaged position of FIG. 2, wherein the contact fingers 20 are electrically connected to the primary contacts 26. In this position, power may be supplied through the circuit breaker to the protected circuit. When servicing the circuit breaker is desired, power is disconnected by opening the circuit breaker, and a crank (not shown and well known in the art) is secured to the hex drive 52 of drive screw 50. The rotation of drive screw 50 moves levering in block 54 forward, thereby moving the circuit breaker 14 forward so that the quick disconnects 18 are brought out of engagement with the channels 24. The circuit breaker 14 is now completely isolated from electrical power, as illustrated in FIG. 1. In this position, the door may be opened, and the circuit breaker may be serviced safely. When service is complete, the door is closed, and the crank is again secured to the hex drive 52 of drive screw 50 so that drive screw 50 may be rotated in the opposite direction, thereby moving the levering block 54 and circuit breaker 14 rearward. The quick disconnects 18 are thereby brought into engagement with the channels 24, bringing the contact fingers 20 back into electrical contact with the primary contacts 26.

Figure 8:
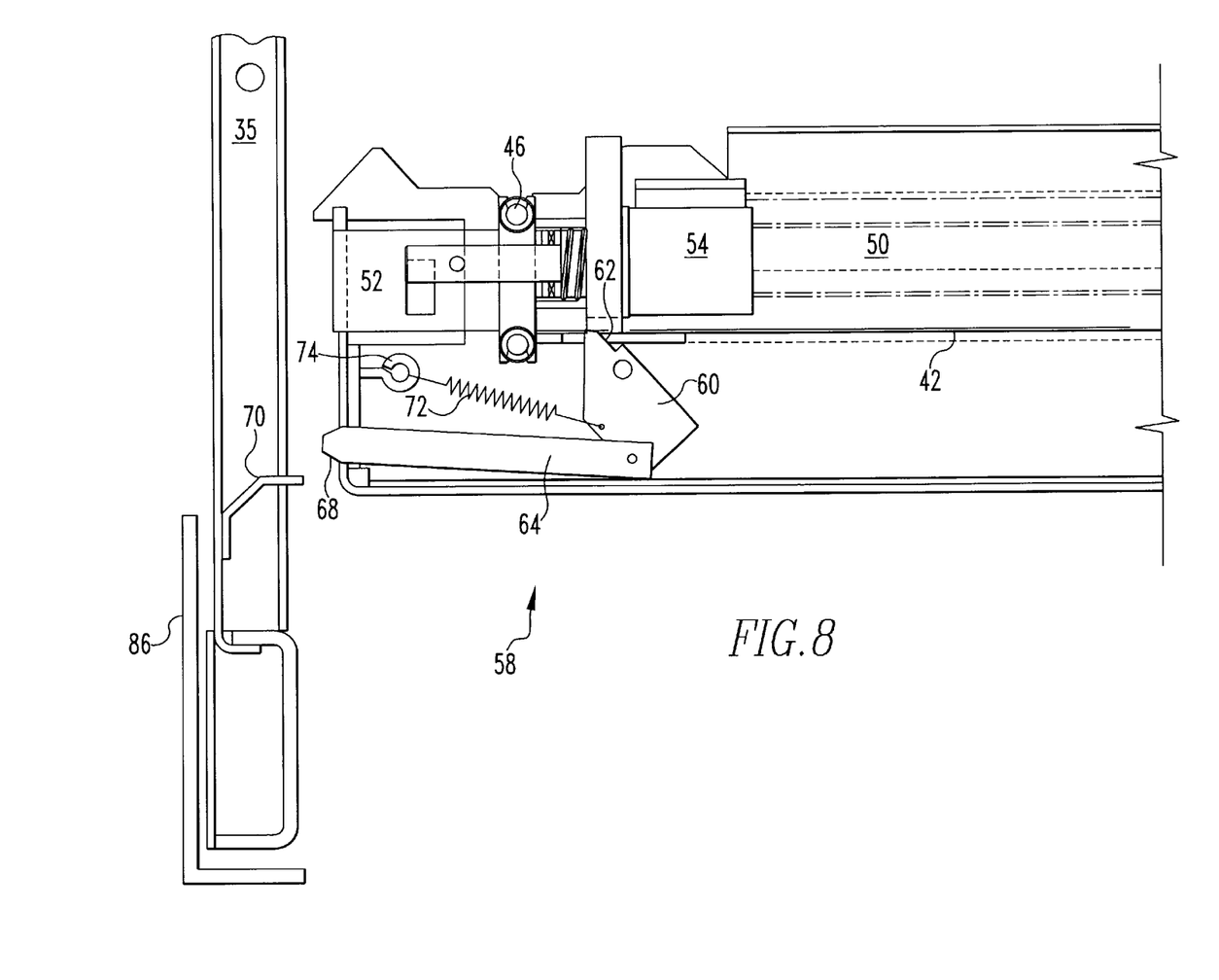
FIG. 8 is a side view of an interlock according to the present invention, with the interlock in the unlocked position.
Figure 9:
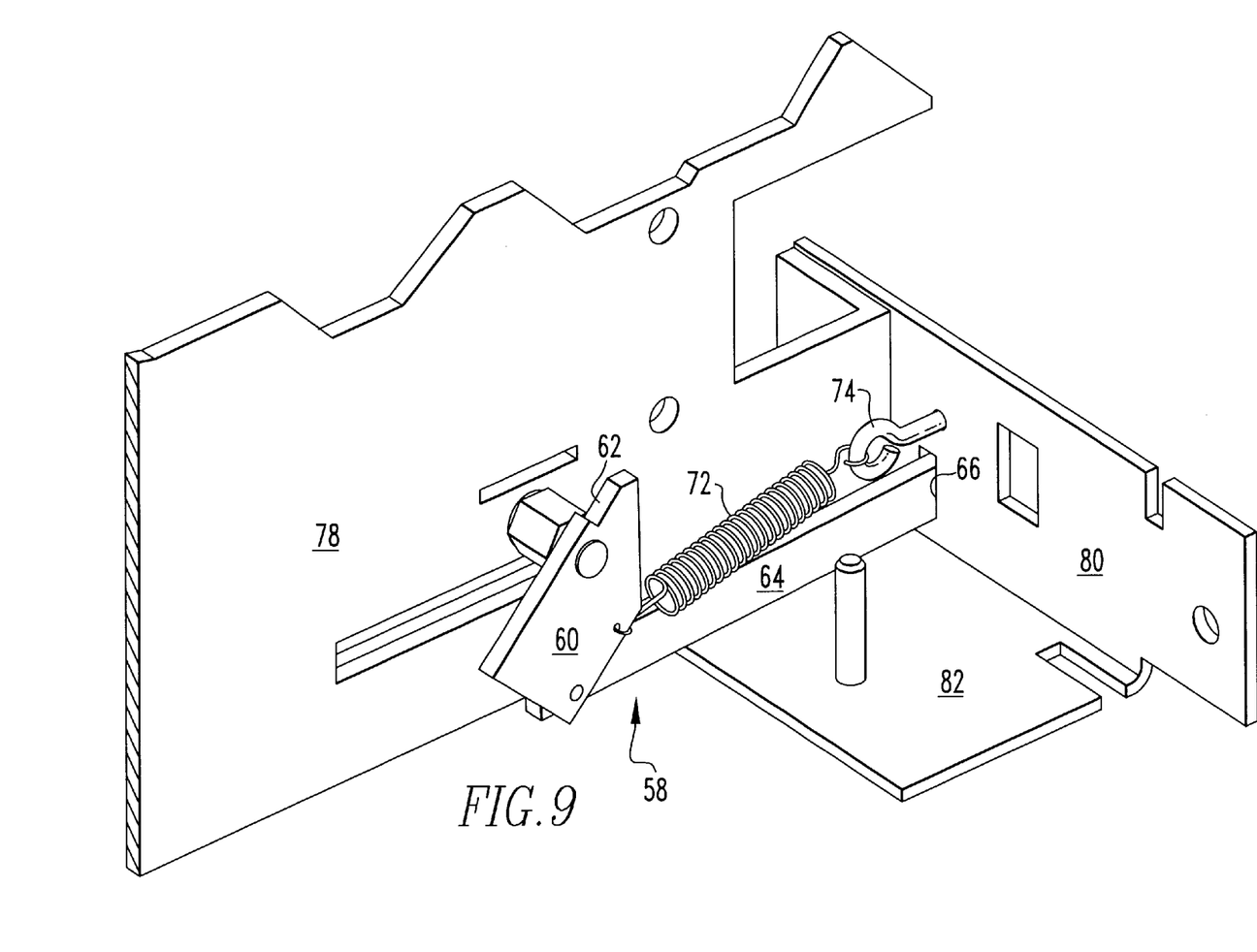
FIG. 9 is a rear isometric view of an interlock according to the present invention, with the interlock shown in the unlocked position.

It becomes apparent from the above description that keeping the door 35 of the cabinet 12 closed unless the circuit breaker 14 is in the fully forward position of FIG. 1 is desirable to prevent any possibility of injury to personnel servicing the circuit breaker 14. The interlock of the present invention accomplishes this purpose. The cabinet 12 includes means for preventing the door from being opened without first raising the door. For example, a lip 86 (illustrated schematically in FIGS. 5 and 8) may secure the door in its closed position, thereby contributing to the arc-resistance of the cabinet 12. The door 35 is designed so that opening the door 35 requires first raising it above the lip 86 in the bottom of cabinet 12, before pivoting the door outward. Alternatively, one or more pegs located in the cabinet bottom 40 may engage corresponding holes in the bottom of the door 35, requiring the door 35 to be raised above the pegs before being pivoted outward. The location of the pegs and holes may obviously be reversed. The interlock of the present invention in its most preferred embodiments prevents the door 35 from being raised if the circuit breaker 14 is not in its fully forward position.

Figure 4:
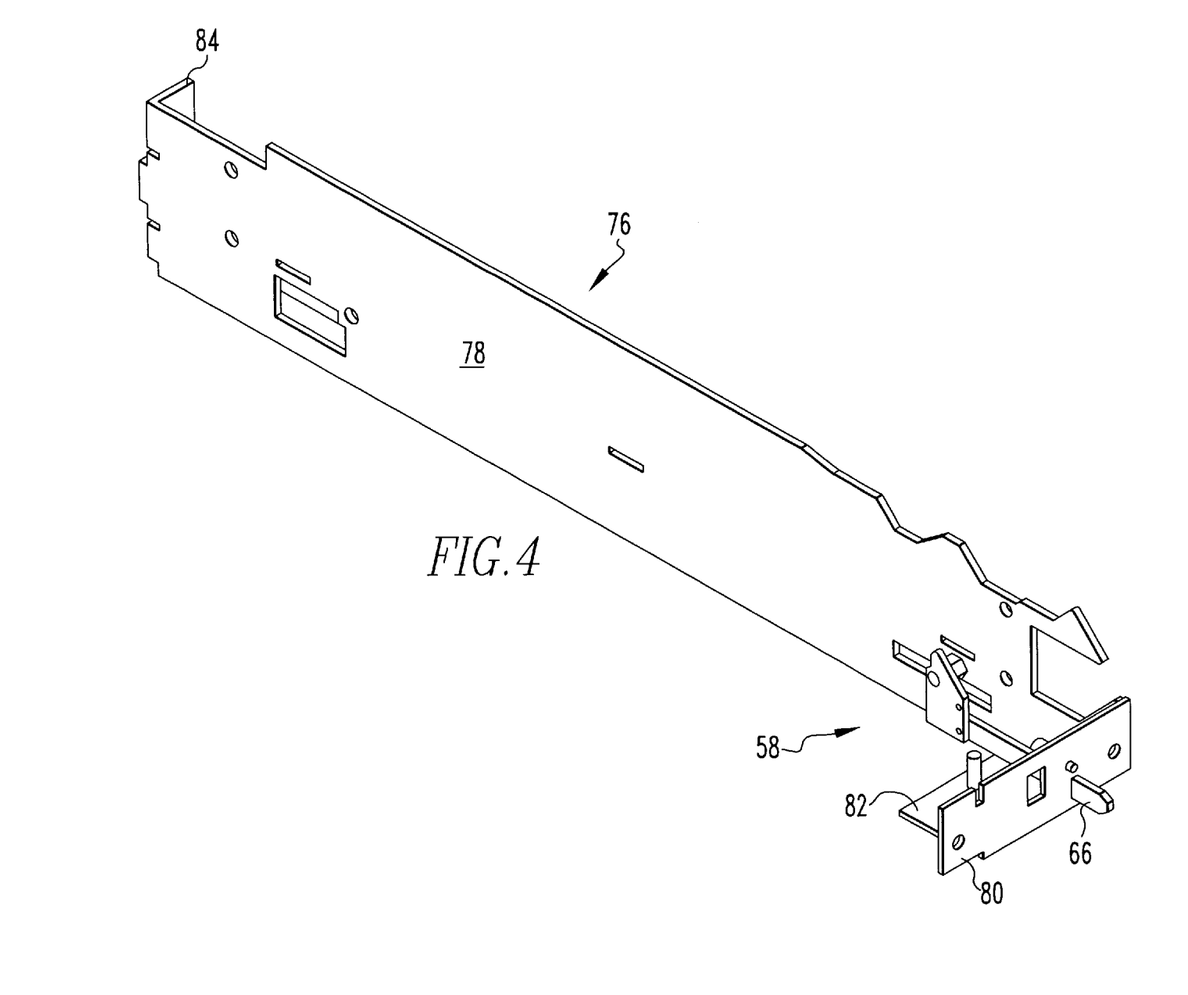
FIG. 4 is an isometric view of an interlock assembly according to the present invention.

Referring to FIGS. 4–9, an interlock of the present invention is illustrated. The interlock assembly is illustrated in FIG. 4. The interlock assembly 76 is preferably dimensioned and configured to mount the interlock 58 adjacent to the front levering block 46 of levering in assembly 44, so that the levering in assembly 44 disengages the interlock when the circuit breaker 14 is in its forwardmost, disengaged position, as explained below. Preferred means for mounting the interlock assembly 76 include an interlock support plate 78, extending parallel to the levering in assembly 44. The assembly 76 also includes means for securing the interlock assembly plate 76 to the cabinet 12, preferably including a front mount 82, and a rear mount 84. The guide 80 includes an aperture 66, dimensioned and configured to guide a locking bar 64 (described below).

The interlock 58 includes a cam 60, pivotally secured adjacent to the drive screw 50 and front bearing block 46. The cam includes a contact surface 62, dimensioned and configured to engage the levering in block 54 when the levering in block 54 is in its forwardmost position. A locking bar 64 is pivotally secured to the cam 60, opposite the contact surface 62. The locking bar 64 passes through an aperture 66 defined within the guide 80, and terminates in a door-engaging portion 68. The door-engaging portion 68 is dimensioned and configured to block the upward movement of a tab 70 within the door 35, thereby securing the door 35 in its lower position. The aperture 66 is dimensioned and configured to position the door-engaging portion 68 so that it can block the upward movement of the tab 70. The cam 60 is biased so that the locking bar 64 engages the locking tab 70, preferably by a spring 72, extending between the cam 60 and an eyebolt 74 secured to the guide 80.

Figure 5:
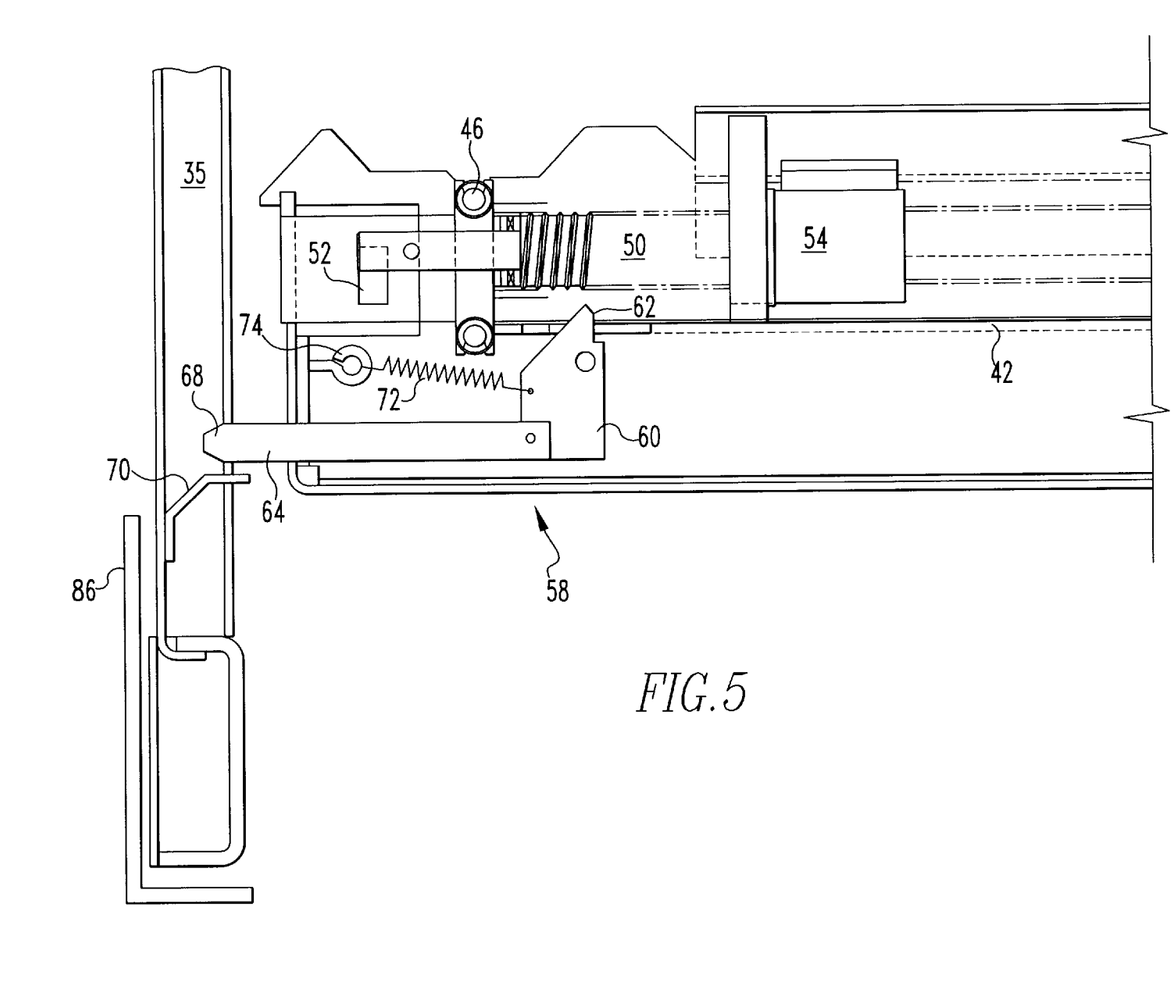
FIG. 5 is a side view of an interlock mechanism of the present invention, with the interlock in the locked position.
Figure 6:
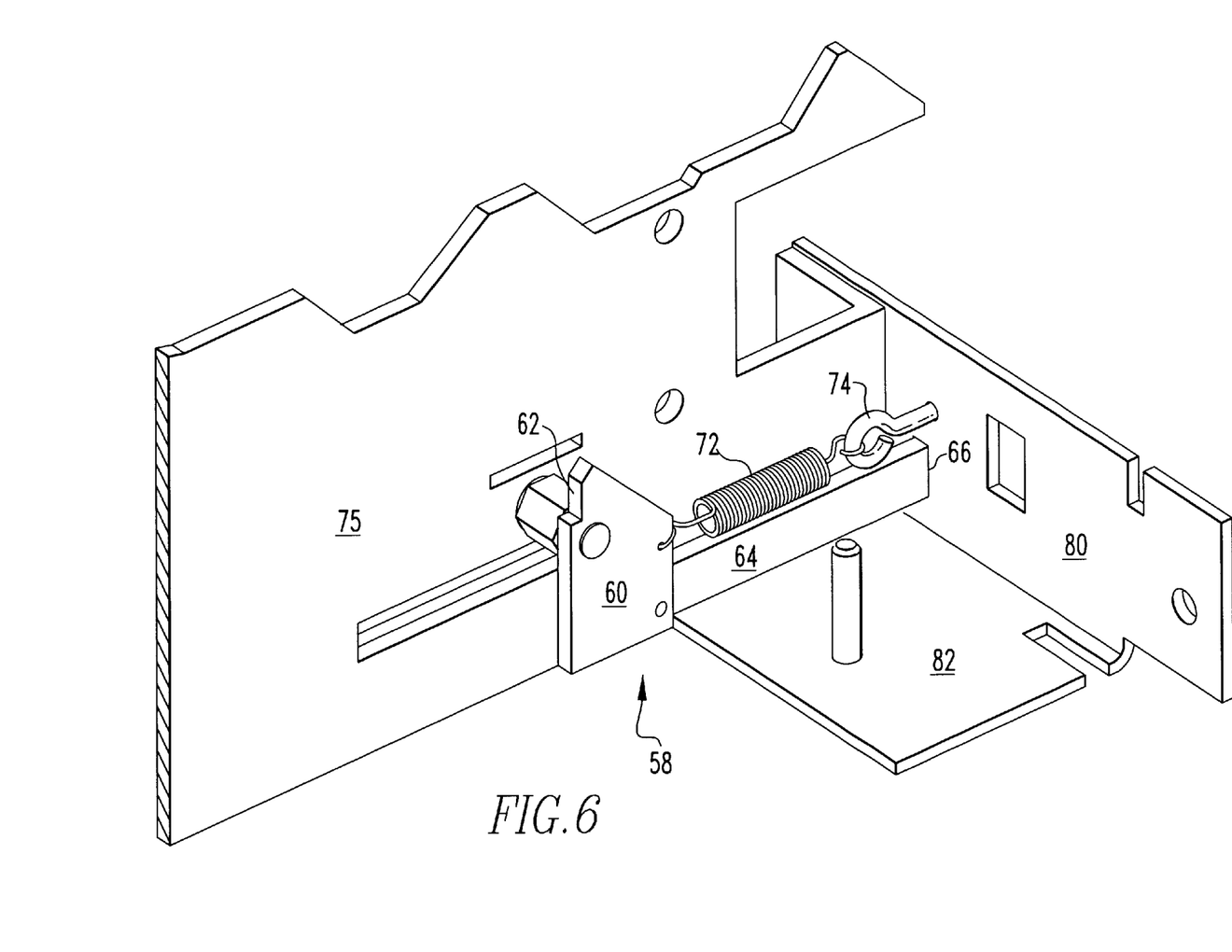
FIG. 6 is a rear isometric view of an interlock according to the present position, with the interlock in the locked position.
Figure 7:
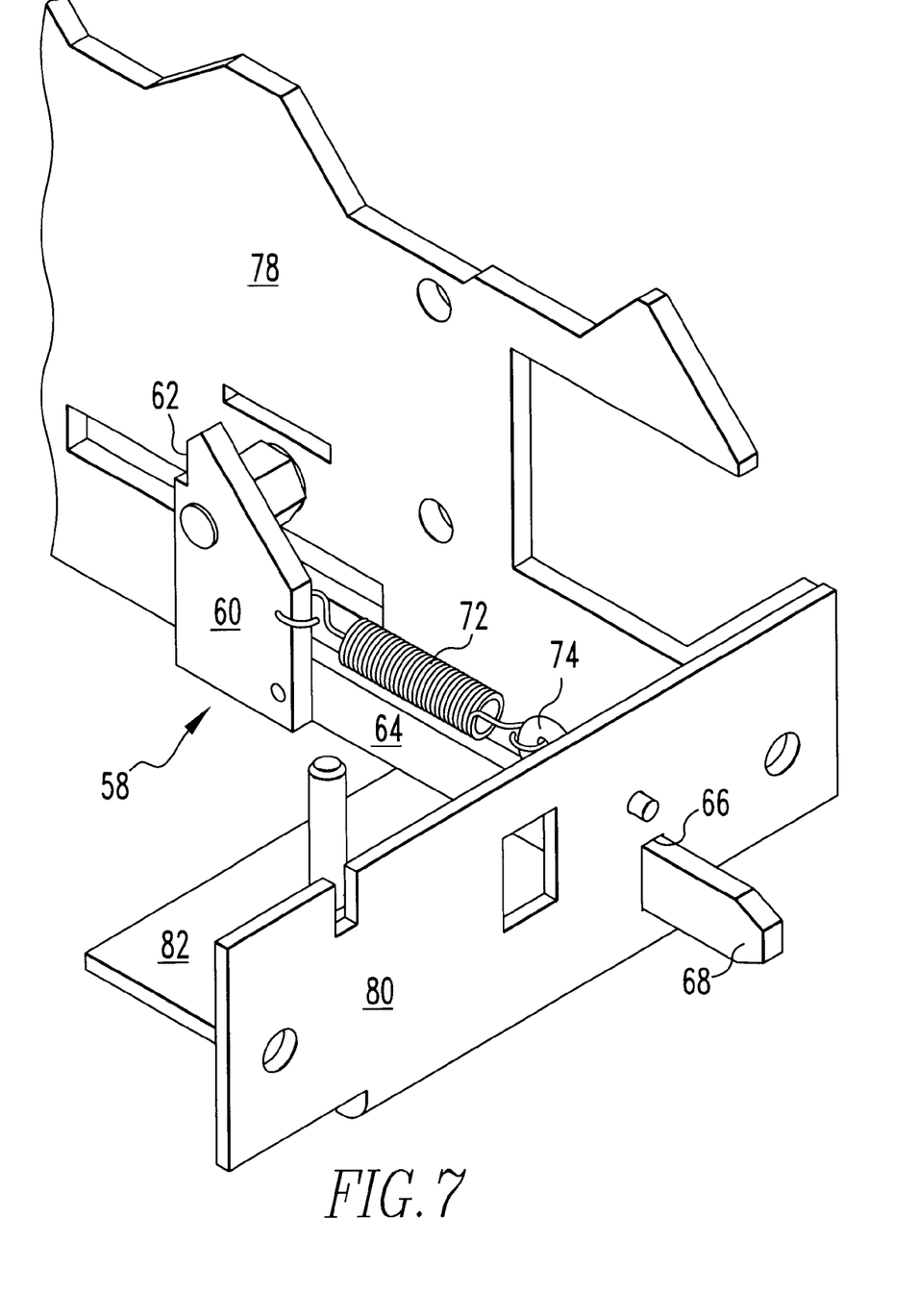
FIG. 7 is a front isometric view of an interlock according to the present invention, with the interlock in the locked position.

When the levering in block 54, and therefore the circuit breaker 14, is in any position within the cabinet 12 other than the forwardmost position of FIG. 1, the interlock 58 is in the position shown in FIGS. 4–6, wherein the door engaging portion 68 of locking bar 64 extends into the path of the locking tab 70, thereby preventing the door 35 from being raised so that it can be pivoted outward. The cam is dimensioned and configured to retract the locking bar from the door when the circuit breaker is in its forwardmost position, wherein it is disconnected from the circuit. When the circuit breaker 14 must be serviced, a crank is secure to the hex drive 52 of drive screw 50 as described above, and drive screw 50 is rotated to move levering block 54 and circuit breaker 14 to the forwardmost position of FIG. 1 within the cabinet 12. As the levering in block 54 approaches the forwardmost position, the levering in block 54 strikes the contact surface 62 of cam 60, thereby rotating the cam 60 so that the locking bar 64 is withdrawn from the locking tab 70. The door 35 may now be raised to clear its lower lip, and rotated outward to open the cabinet 12.

After completion of service to circuit breaker 14, the cabinet door 35 is again closed, and the circuit breaker 14 is levered back into the position of FIG. 2. A crank is secured to the hex drive 52 of drive screw 50, and the drive screw 50 rotated in the opposite direction to move the levering in block 54, and therefore the circuit breaker 14, rearward. As the levering in block 54 begins to move rearward, the levering in block 54 is removed from contact with the contact surface 62 of cam 50, thereby permitting the cam 60 to rotate under the bias supplied by spring 72 back to its original position. The locking bar 64 is thereby brought back into engagement with the doors locking tab 70. The door 35 is now secured in its closed position.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An interlock for a cabinet, the cabinet including a door and means therein for moving electrical equipment contained therein between a rearward, connected position and a forward, disconnected position, said interlock comprising:
   a cam pivotally secured adjacent to said means therein for moving electrical equipment contained therein between a rearward, connected position and a forward, disconnected position;
   a locking bar dimensioned and configured to engage the door, said locking bar being coupled to said cam;
   said cam pivoting between a first position wherein said locking bar prevents opening the door, and a second position wherein said locking bar is retracted from said door;
   means for biasing said cam towards said first position; and
   said cam being dimensioned and configured to retract said locking bar from the door when the electrical equipment is in the forward position.

2. The interlock according to claim 1, further comprising a surface of said cam, said surface being dimensioned and configured for engaging the means for moving electrical equipment between a rearward, connected position and a forward, disconnected position when the electrical equipment is in the forward position.

3. The interlock according to claim 1, wherein the means for moving electrical equipment between a rearward, connected position and a forward, disconnected position is a levering in assembly, said levering in assembly disengaging said interlock when the electrical equipment is in its disconnected position.

4. The interlock according to claim 1:
   further comprising an interlock support plate; and
   wherein said cam is pivotally secured to said interlock support plate.

5. The interlock according to claim 1, wherein said means for biasing said cam towards said locked position is a spring.

6. A cabinet for housing electrical equipment, said cabinet comprising:
   a door;
   means for moving electrical equipment between a rearward, connected position and a forward, disconnected position; and
   an interlock, comprising:
      a cam pivotally secured adjacent to said means therein for moving electrical equipment contained therein between a rearward, connected position and a forward, disconnected position;
      a locking bar dimensioned and configured to engage the door, said locking bar being coupled to said cam;
      said cam pivoting between a first position wherein said locking bar engages the door, and a second position wherein said locking bar is retracted from said door;
      means for biasing said cam towards said first position; and
      said cam being dimensioned and configured to retract said locking bar from said door when said electrical equipment is in the forward position.

7. The cabinet according to claim 6, further comprising a surface of said cam, said surface being dimensioned and configured for engaging the means for moving electrical equipment between a rearward, connected position and a forward, disconnected position when the electrical equipment is in the forward position.

8. The cabinet according to claim 6 wherein said means for moving electrical equipment between a rearward, connected position and a forward, disconnected position is a levering in assembly, said levering in assembly disengaging said interlock when the electrical equipment is in its disconnected position.

9. The cabinet according to claim 8:
   wherein said levering in assembly includes a threaded rod and a levering in block threaded to said threaded rod; and
   further comprising a surface of said cam, said surface being dimensioned and configured for engaging said levering in block when the electrical equipment is in the forward position.

10. The cabinet according to claim 6:
    further comprising an interlock support plate; and
    wherein said cam is pivotally secured to said interlock support plate.

11. The cabinet according to claim 6, wherein said means for biasing said cam towards said first position is a spring.

12. The cabinet according to claim 6, further comprising a lip dimensioned and configured to secure said door in a closed position, over which the door must be raised before opening the door, the locking bar preventing the door from being raised when said locking bar engages the door.

13. A cabinet, comprising:

a door;

means for preventing said door from being opened without first raising said door; and an interlock preventing said door from being raised when said interlock engages said door.

14. The cabinet according to claim 13, wherein said interlock includes a locking bar, said locking bar preventing said door from being raised when said locking bar engages the door.

15. The cabinet according to claim 14, further comprising a cam, said cam pivoting between a first position wherein said locking bar prevents opening the door, and a second position wherein said locking bar is retracted from said door;

means for biasing said cam towards said first position; and said cam being dimensioned and configured to retract said locking bar from the door when a electrical equipment is in a forward position.

16. The cabinet according to claim 15, further comprising a levering in assembly, said levering in assembly disengaging the interlock.

17. The cabinet according to claim 16:

wherein said levering in assembly includes a threaded rod and a levering in block threaded to said threaded rod; and further comprising a surface of said cam, said surface being dimensioned and configured for engaging the levering in block when the electrical equipment is in the forward position.

* * * * *